Figure 1:
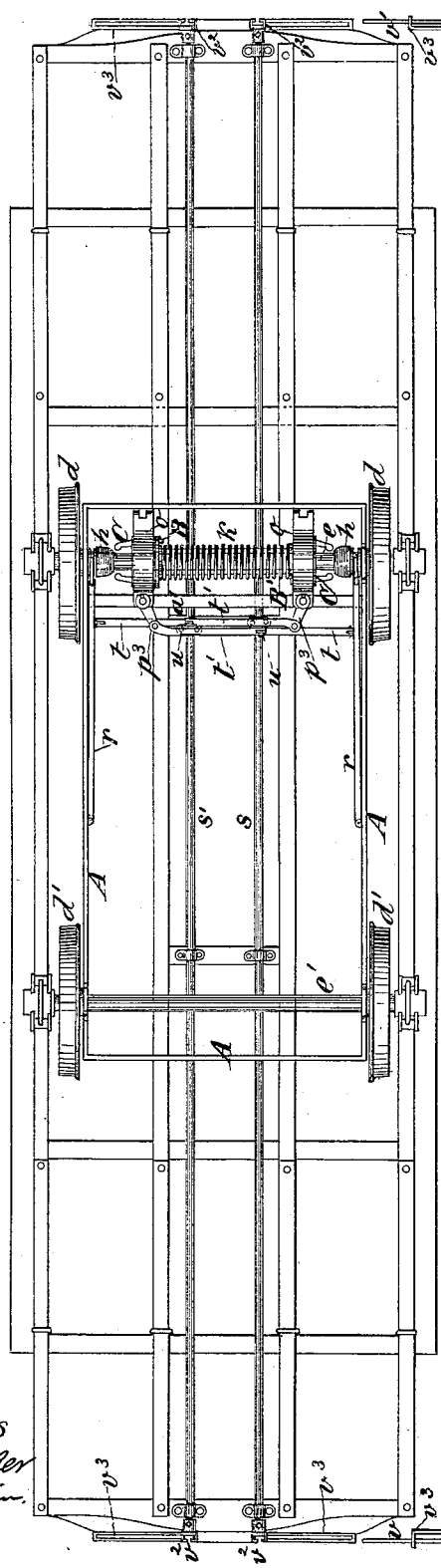

(No Model.) 3 Sheets—Sheet 1.
J. N. WILLIAMS.
CAR BRAKE AND STARTER.

No. 377,094. Patented Jan. 31, 1888.

WITNESSES
John Becker
Jno. E. Gavin

INVENTOR
J. Newton Williams
by Chas. M. Higgins
Attorney

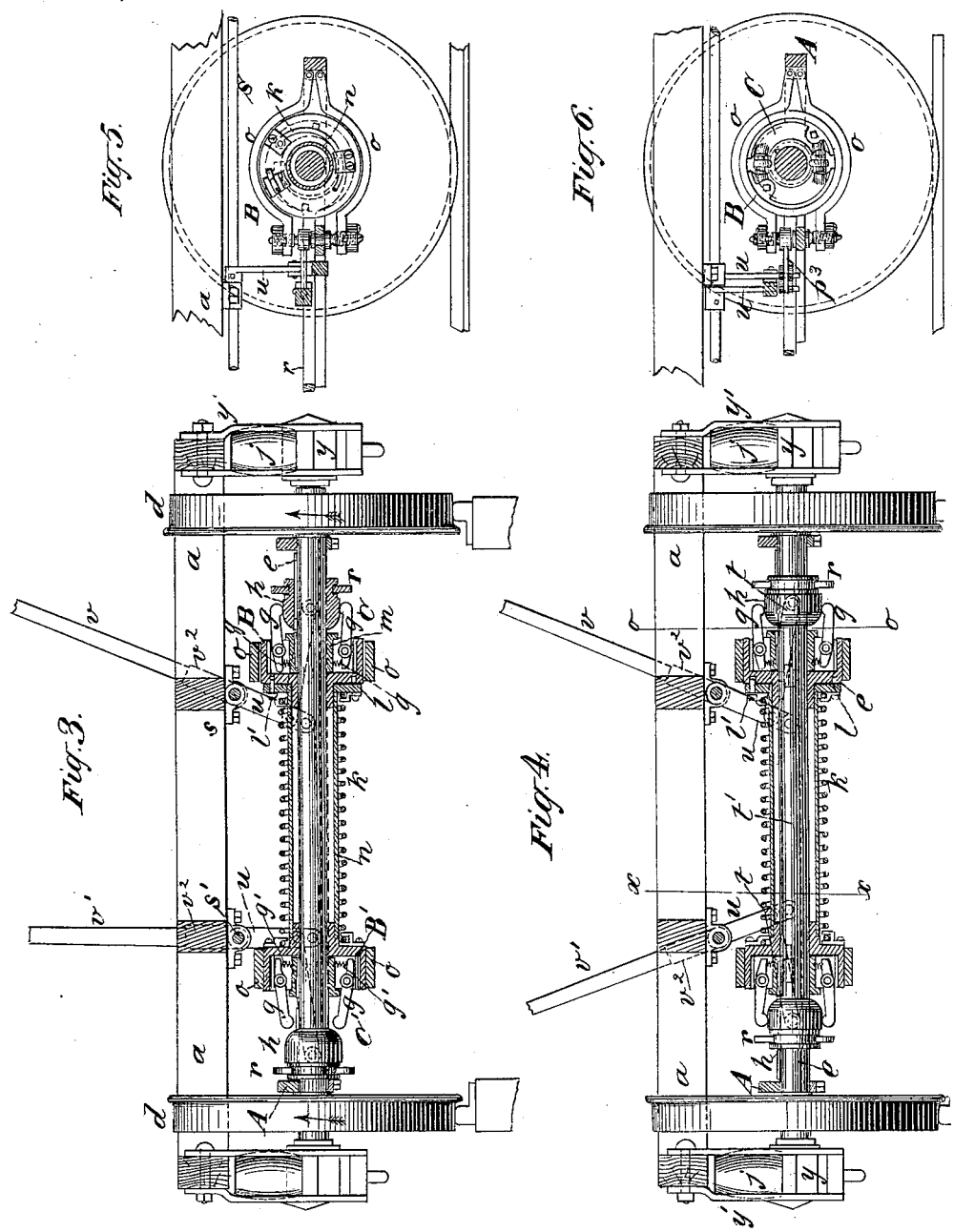

(No Model.) 3 Sheets—Sheet 3.
J. N. WILLIAMS.
CAR BRAKE AND STARTER.
No. 377,094. Patented Jan. 31, 1888.
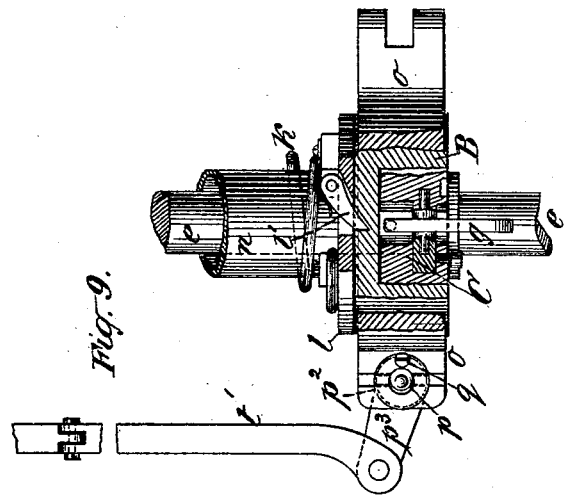
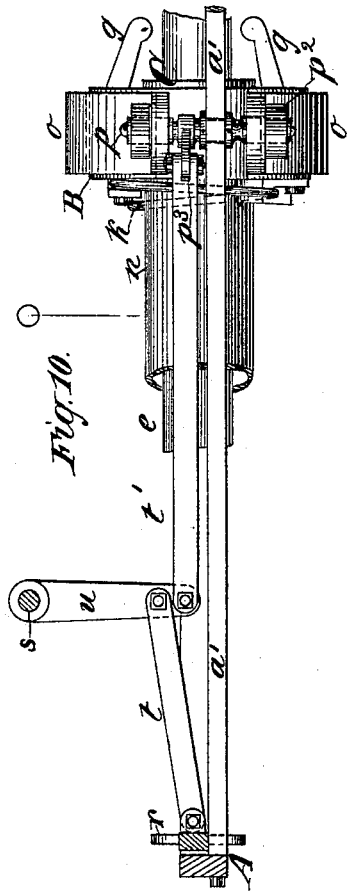
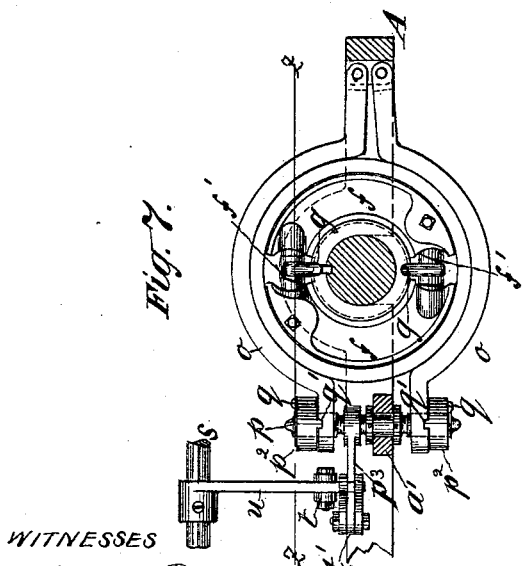
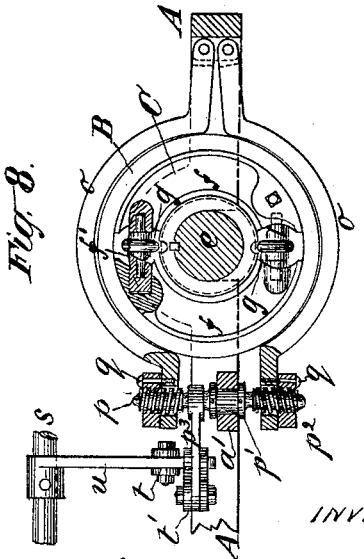
WITNESSES
John Becker
Jno. E. Gavin
INVENTOR
J. Newton Williams
by Chas. M. Higgins
Attorney
N. PETERS, Photo-Lithographer, Washington, D. C.

UNITED STATES PATENT OFFICE.

JOHN NEWTON WILLIAMS, OF NEWARK, NEW JERSEY.

CAR BRAKE AND STARTER.

SPECIFICATION forming part of Letters Patent No. 377,094, dated January 31, 1888.

Application filed February 12, 1887. Serial No. 227,381. (No model.)

*To all whom it may concern:*

Be it known that I, JOHN NEWTON WILLIAMS, now residing in Newark, Essex county, New Jersey, have invented certain new and useful Improvements in Car Starters and Brakes, of which the following is a specification.

My invention belongs to that class of car-starters which employ a torsional coil or spiral spring upon the axle connected at each end to pulleys or disks loose upon the axle with clutches to clutch either disk to the axle and holders or stops to hold either disk stationary, the clutch of one disk and the holder of the other being operated at the same time.

In my improvement both clutches and holders are frictional, and an idle play exists in the operative connection between the clutch of one disk and the holder of the other disk, whereby after the clutch is set the idle play between the two allows the holder to be tightened more or less to act as a brake to control the car and to govern the winding of the spring at more or less tension at the will of the operator, according to the load and the speed of the car and the nature of the grade on which it is running, thereby making a more efficient brake as well as a car-starter adapted to meet all the necessary conditions of car operation. Moreover, in my improvement the spring is connected at one end by a ratchet-connection to its disks or pulley, so that injurious reverse winding of the spring is impossible, and the spring with its pulleys or disks and their clutches and holders are so relatively arranged on the axle as to secure great simplicity and completeness of mechanism, and the operating and manipulating devices are so connected with the respective clutches that all operations of the combined car starter and brake can be performed by the manipulation of two simple hand-levers on the platform; hence by these means not only is all overstraining of the spring obviated and its tension governed to suit the work and sliding of the wheels on the rails prevented, but the need of ordinary shoe-brakes is entirely dispensed with and a perfect control of the car is maintained.

My invention therefore embodies a number of novel features relating to the special construction, combination, and arrangement of parts above outlined, as hereinafter fully set forth and claimed, whereby a very simple and complete car starter and brake is produced.

Figure 2:
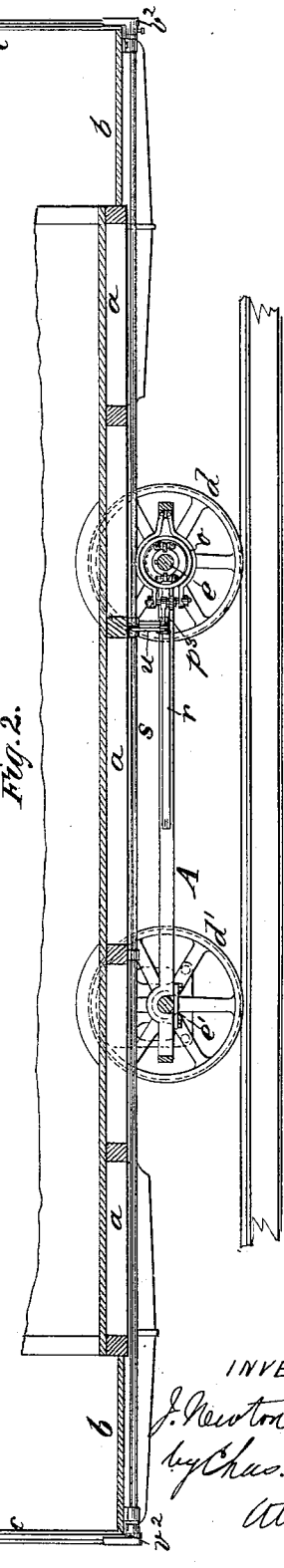

In the drawings annexed, Figure 1 gives an inverted plan of an ordinary street-car equipped with my improved brake and starter. Fig. 2 is a sectional side elevation of the same. Fig. 3 is an enlarged section across the car or lengthwise of the axle, showing the starter mechanism with one clutch and holder set as in the position to arrest the motion of the car. Fig. 4 is a similar view showing both clutches and holders set after the car has come to rest to hold the spring wound up ready for release to start the car when again desired to go ahead. Fig. 5 is a cross section on *x x* of Fig. 4; and Fig. 6 is a cross-section on *o o*, both looking to the left. Fig. 7 is an enlarged view endwise of the axle, showing the spring-disks with their clutches and holders and their operating mechanism. Fig. 8 is a similar view showing the parts in section. Fig. 9 is a sectional plan on line *y y* of Fig. 7. Fig. 10 is an enlarged fragmentary elevation lengthwise of the axle, illustrating the mechanism for operating the clutches and holder-brakes.

Referring to Figs. 1 and 2, *a* indicates the frame or floor of the car, *b* the end platforms, and *c* the dash-boards, all as usual.

*d d'* indicate the car-wheels, and *e e'* the axles, to which the wheels are fixed, as usual, the journal ends of said axles being received in the usual movable boxes, *y*, acted upon by springs *j*, and mounted in the guides or hangers *y'* in the ordinary manner.

Now, A indicates a light rectangular metal frame, which is supported upon the two axles, which turn freely in the sides of the said frame, as shown in Figs. 1, 2, 3, and 4, and upon which frame most all parts of the starter and brake mechanism are sustained. Now, this starter-and-brake mechanism is shown in Figs. 1 and 2 as connected with one axle and pair of wheels only, as this is all that is practically required; but of course the mechanism may be duplicated on the other axle, if desired; but it is neither contemplated or commended.

Referring now to Figs. 3 and 4, the general construction of the brake-and-starter mechanism will be readily apparent—that is, B B' indicate two friction pulleys or disks, which are mounted loosely upon the axle and free to turn thereon, and they are separated on the axle a distance about one-half the length of the same, so as to allow a powerful torsional coil or spiral spring, *k*, to be placed between them, the opposite ends of which spring are fastened to the said disks, as shown. One end of this spring $k$ is connected directly and positively to the disk B'; but the opposite end of the spring is not connected directly to the other disk, B, but is fastened positively to an intermediate ring or collar, $l$, which carries a pawl, $l'$, which engages with ratchet-teeth $e'$ on the disk B, as best seen in Figs. 9 and 4, for a purpose which will be hereinafter apparent. The said pawl and ratchet engage in the direction in which the wound-up spring reacts, but slip in the direction in which the quiescent spring would open or unwind, so that it will be thus impossible to wind the spring in the reverse or destructive direction, as will hereinafter more clearly appear.

Referring again to Figs. 3 and 4 it will be seen that the outer ends of the pulleys B B' are deeply recessed to receive the friction-clutches C C', the hubs $m\ m$ of which are keyed to the axle and abut against the disk, so as to restrain them from moving endwise out of place. The disks are restrained from moving toward each other by the loose sleeve $n$, which extends between the disks, one end thereof turning loosely on the shouldered hub of the disk B', as seen in Figs. 3 and 4, while the other end fits over the hub of the opposite disk and abuts against the ratchet-collar $l$, thus restraining the latter from moving out of place, this ratchet-collar being at the same time held elastically against the ratchet-face of the disk B by the endwise compressive tension of the spring $k$. The spring $k$ loosely encircles the sleeve $n$, which thus acts as a guide or support therefor, which prevents irregular twisting, bending, or kinking of the spring when wound up, as will be understood. The friction-clutches C C', which I illustrate, are those known as the "Blevney Clutch;" but any other suitable clutch may be used. The clutches C C' are shown best in Figs. 3, 4, 7, and 8, and are formed with semicircular clutching-shoes $f\ f$, which fit between the rim of the disks B B' and the clutch-hub $m$, and between the ends of these brake-shoes are pivoted levers $g$, the long arms of which project out toward a sliding wedging-collar, $h$. The collar $h$ moves on a spline on the axle, and when slid between the levers it thus diverges the same, and thereby wedges or screws the shoes $f$ forcibly out against the rim of the disk B or B', this wedging action being accomplished by virtue of the cam or screw inclines $f'$ between the fulcrum-pin of the levers and the ends of the shoes, as well shown in Figs. 8 and 7, thereby clutching the disk firmly to the axle.

Now, referring again to Figs. 7 and 8, it will be seen that the outer rim or periphery of the disks or pulleys B B' are encircled or nearly encircled by two stiff semicircular brake-bands or clasps $o$. (Shown also in Figs. 1, 2, 3, 4, and other figures.) These brake-bands are pivoted at one end to lugs projecting from one end of the frame A, as well shown in Figs. 1, 2, 5, 6, 7, and 8, while the other ends of the bands are connected by the right and left threaded rock-shaft $p$, the middle of which turns in a fixed cross-bar, $a'$, of the frame A, (see Figs. 7, 8, and 1,) and is restrained from moving up or down in its bearings by shoulders or collars $p'$. The right and left threaded screws on the respective ends of the rock-shaft screw into nuts $p^2$, held on the ends of the brake-bands by studs $q$, and prevented from turning on the bands by a tongue, $q'$, on the nuts engaging a groove on the bands, as well shown in Figs. 7 and 8. Now normally the brake-bands stand spread or relaxed on the periphery of the pulleys B or B', as seen in Figs. 5 and 8, thus allowing the pulley to turn freely within the same. If, however, the rock-shaft $p$ is rocked or partly rotated in a direction to screw in the nuts $p^2$, the bands $o$ will be tightened forcibly on the pulleys, as seen in Figs. 6 and 7, thus holding the pulleys from rotating with a grasp of more or less power, according to the adjustment of the parts and the force applied. A lever, $p^3$, projects from the rock-shaft $p$, and is connected with the operating mechanism, whereby the shaft may be rocked one way or the other to tighten or loosen the brakes, as will hereinafter appear.

The sliding grooved collars $h$ of the friction-clutches C C' are engaged by the forked end of long levers $r$, (see Figs. 1, 2, 3, 4, and 10,) which levers are pivoted close to the long sides of the frame A and lie parallel with the same, as shown best in Figs. 1, 2, and 10, and serve to move the collars in or out to throw the clutch in or out of action. When the collars are thus slid outward, springs $g'$, interposed between the clutch-hub $m$ and the short arm of the levers $g$, act to relax the clutch-shoes $f$ and sway the long arms of the levers toward each other, as seen on the left of Fig. 3. Now, the clutch-shifting levers $r\ r$ and the brake-acting levers $p\ p$ at the opposite ends of the springs $k$ are connected in relatively reverse order with the operating mechanism or manipulating devices under the control of the driver from the car-platform, which will be now explained.

Referring to Figs. 1 and 2, $s\ s'$ indicate two rock-shafts extending longitudinally beneath the car-floor from end to end, being suitably supported in bearings at the ends and at intermediate points, and terminate at each end with socket-heads $v'$, which project just beyond the end of the platforms and in front of the dash-boards. These socket-heads are formed with T-shaped grooves or sockets adapted to receive the lower end of removable hand-levers $v$, which may be shifted from one end of the car to the other when the horses are shifted, as will be readily understood. The upper end of these hand-levers will work in slotted guides $v^3$ on the upper edge of the dash-boards, and the handle of the levers project above said guides for the easy grasp of the driver, as seen in Figs. 1 and 2. Now, from about the middle of each rock-shaft a crank arm or lever, $u$, extends downwardly to the level of the frame A, (see Figs. 3, 4, 5, 6, and 10,) and each lever is connected by a short link, $t$, with one of the clutch-shifting levers $r$, and by a long link, $w$, with the brake screw-lever $p^3$.

It will thus be seen that the clutches and brakes at the opposite ends of the spring are connected in reverse order to the operating hand-levers—that is, referring to Fig. 3 it will be seen that when the hand-lever $v$ on the right is swayed outward that the clutch C on the right will be set and the brake $o$ on the left tightened; hence the right end of the spring will be clutched to the axle, while the left end is held from rotating. It will therefore be readily understood, referring to Fig. 3, that if the car is under motion, with the parts in the position shown—the car traveling away from the observer and the wheels consequently revolving in the direction of the arrows—that the spring will now be wound up and the increasing elastic resistance thereof will thus arrest the motion of the car. As soon, therefore, as the car is brought to rest by the resistance of the wound-up spring, the hand-lever $v'$ on the left is thrown over, as shown in Fig. 4, which will set the left clutch, C', and the right brake $o$, and thus cause both ends of the spring to become clutched to the axle, and thereby hold both ends from revolving, thus preventing the spring from unwinding and holding the car stationary. Now, as the opposite ends of a wound-up torsional coil or spiral tends to revolve in opposite directions, it will be readily understood that the car can be started either forward or backward, according to whichever hand-lever is first moved back to its normal position.

To start the car forward, the hand-lever $v$ on the right, which was first moved out to stop the car, is now first moved back to its normal position, which, by referring to Fig. 4, it will be seen will have the effect of loosening the brake $o$ on the left, but leaving the clutch C' on the left set, so that the left end of the spring will be clutched to the axle, while the brake on the right will remain tight to hold that end of the spring stationary, while the right clutch will be loosened to let the axle and clutch turn freely in the clamped spring disk or pulley B; hence, as the left end of the spring will be then clutched to the axle while the right end is held stationary, (the reverse of Fig. 3,) the reaction of the spring, which in Fig. 3 would turn the axle and wheels backward, and thus back the car, will be now reversed, (because the reverse end of the spring is acting,) and will therefore revolve the axle and wheels forward, and thus impart a forward impetus to start the car. This impetus may be enough to positively move the car or only enough to greatly assist the horses in doing so, according to the power of the spring adopted, as will be understood. It will therefore be seen that in stopping the car the spring is wound up from one end, but in starting it, it is unwound from the opposite end, and thus revolves the axle in the same direction as that which wound up the spring.

As soon as the car has thus been started forward by moving the right lever up to its straight or normal position, as described, the left-hand lever is then also restored to its normal position, which will thus loosen both clutches and brakes and leave the spring $k$ with its sleeve $n$, pulleys B B', and clutches C C' all free to revolve idly with the axle, which is the normal condition when the car is running free. Now, if the left-hand lever was not thus restored to normal after the car was started, the ratchet-connection $l\ l'$, Figs. 3, 4, and 9, between the right end of the spring and the right disk or pulley B would click, and thus notify the driver to restore the lever. This restoration of the left lever to normal would not, however, be absolutely necessary, except to save unnecessary wear of the ratchet-connection and prevent the noise thereof, and hence the immediate movement of the second or left lever is not imperative and may be attended to at the driver's convenience; but it will be noted that the ratchet-connection of one end of the spring with the clamped disk or pulley is absolutely necessary to save the spring, for if the spring was rigidly connected at each end to the opposite pulleys, then the left or second lever would have to be restored to normal immediately after the wound-up spring had fully unwound itself to start the car, so as to unclutch the rotating end of the spring from the axle and free the fixed end, or else the momentum imparted to the car would now wind the spring in its reverse or opening direction, and thus injure or destroy the same. This, therefore, explains the function and purpose of connecting the spring at one end to its clutch-pulley by a ratchet-connection which engages in the direction in which the wound-up spring reacts to drive the axle, but slips in the reverse direction, which is novel with me and a most important provision of my apparatus. Without this provision each end of the spring must be unclutched immediately from the axle after the starting impulse is imparted, which is practically impossible in the ordinary operation of cars, and has been one of the serious objections in some former car-starters.

It may be observed by referring to Figs. 1, 2, 3, and 4 that the car is not provided with brake shoes or other portions of the ordinary brake mechanism, which is entirely dispensed with, for it will be perceived that the starter mechanism acts as a perfect brake, and will act to stop the motion of the car and hold it stationary, either on a grade or level, and will afterward start it either forward or backward, as desired, or it may act simply to check the speed of the car to allow passengers to get on or off easily without actually stopping the car, as is the case with the ordinary shoe-brake. To make this braking action more perfect and accommodating, it will be seen by referring to Figs. 3 and 4 that the relation of the brakes and clutches to each other and the operating mechanism is such that after the clutch is fully set by the movement of the tapering part of the clutch-collar $h$ between the levers $g$, a considerable movement of the straight part of the collar between the clutch-levers $g$ can take place without further affecting the clutch, while during this idle movement of the clutch-collar the movement of the brake mechanism will be active, to tighten the brakes $o$ in a constantly-increasing manner, so as to apply more or less of a brake resistance to the motion of the car, as may be required, according to the load, speed, grade, or other conditions, so that the driver has thus full and easy control of the car by moving the hand-lever more or less, as will be readily appreciated, and even in a better manner than with the ordinary brakes.

It will be seen that in my device if the disk does not slip in the brakes the clutch will slip in the disk, and thus save the spring from being overwound and prevent the wheel sliding on the track, as is likely to occur if either clutch or brake is positive.

In my device the grasp of the friction-clutches may be so adjusted as to slip when the spring receives a safe tension and less than that necessary to make the wheels slide on the track, whereas if the clutches were positive it will be seen that this safe condition might be often exceeded, for the obvious reason that the grasp of the brakes $o$ $o$ is largely determined by the extent of movement of the hand-lever and the pressure of the driver, which will vary considerably and may often exceed the grasp of the clutches, and is, in fact, designedly given this greater scope for better control of the car, as already described, and as will be readily understood on reflection.

In my apparatus the clutches might of course be made positive while the brakes are frictional without altering the other advantages of the mechanism; but what is shown is much preferable. It will therefore be seen that considering the fact that my apparatus fulfills perfectly all the conditions of a car brake and starter, and dispenses entirely with the usual brake mechanism, the machine is comparatively simple and compact, and will add but little to the expense of car equipment over that of the usual brake mechanism.

It will be noted that the device will not only start the car ahead, as described, but will also start it backward, which will be very useful in case a switch is taken wrongly, as is often the case. Again, if the horses get balked in ascending a grade, then, by moving the appropriate levers, the car may be allowed to back down a sufficient distance to wind up the starting-spring, which can be then held for a moment to let the horses rest, after which the horses can be urged forward at the same time that the forward starting-lever is moved to give a forward impulse to the car, which in most all cases will enable the horses to get over difficult points on an incline without trouble.

By dispensing with shoe-brakes and obviating sliding of the wheels on the track it is obvious that rapid wear and injurious and irregular wear of the wheels is obviated, which is important to the life and maintenance of the rolling-stock.

I am aware that it is not new to use friction-clutches to clutch either end of the spring to the axle, with friction-brakes to hold either end of the spring, and hence I do not claim the same; but my invention lies in the peculiar combination and arrangement of the parts, and particularly in the relative connection of the operating hand-levers with the brakes and clutches, whereby new and advantageous results are obtained, which are epitomized below—that is, in my apparatus all actions are controlled by two hand-levers at the dash-board, and these hand-levers (see Figs. 3 and 4) move from the center of the dash-board outward, so that they can be operated by the hand of the driver, or even by his arm pressing laterally without letting go of the reins, and in a manner which is much easier than the rotary motion of the usual crank-handle of the ordinary brake. Furthermore, these levers will remain wherever set, needing no ratchet or catch to hold them, as the friction of the parts will be sufficient to hold them, and the resistance of the connections does not react in such a way as to tend to forcibly move the levers, which are very important features in rendering the apparatus very easy of manipulation to the driver.

It may be observed that another characteristic difference in my apparatus over preceding car-starters is, that in my case the pulleys to which each end of the spring is connected are normally loose on the axle and are restrained from endwise motion thereon, that the clutches which engage the pulleys to the axle are normally loose, and that the brakes are also normally loose, and that only two distinct operating-levers are employed, each of which when thrown will set the clutch of one pulley and the brake of the other pulley, and vice versa, and it will be therefore noted from this relative combination and arrangement of parts great completeness and simplicity results.

I do not of course limit myself to the precise form of spring shown—that is, a cylindrical torsional coil or spiral—as a spring of conical spiral or flat spiral form might be used, or any other equivalent form arranged in equivalent manner.

What I claim as my invention is—

1. In a car-starter, the combination, with the driving-axle and spring-coil thereon, of two friction-pulleys loose on the axle and connected to opposite ends of the spring, two friction-clutches to clutch either pulley to the axle, and two friction-brakes to hold either pulley stationary, of two operating hand-levers each connected in reverse order with the respective clutches and brakes, substantially as shown and described.

2. In a car-starter, the combination, with the driving-axle and spring-coil thereon, of two loose pulleys to which each end of the spring is connected and clutches to engage each pulley with the axle, and brakes or stops to hold either pulley stationary, with a ratchet-connection between one end of the spring and its pulley arranged to engage in the directions in which the wound spring reacts to drive the axle and slip in the reverse direction, substantially as and for the purpose set forth.

3. In a car-starter, the combination of the driving-axle and two pulleys arranged in fixed position on the axle, but free to turn thereon, a clutch to engage the pulley at one end of spring to axle, and a brake or stop to hold the opposite end stationary at the same time, with a hand-lever connected to the said brake and clutch, whereby one movement of the lever engages one pulley with the axle and holds the opposite pulley from rotating at the same time, substantially as set forth.

4. In a car-starter, the combination of the driving-axle and two pulleys normally loose thereon, a torsional spring or coil connected at opposite ends to said loose pulleys, two clutches normally loose adapted to engage either pulley to the axle, and two brakes or stops normally loose adapted to hold either pulley stationary, with two distinct hand-levers or operating devices, each connected with the clutch of one and the brake of the opposite pulley, whereby the movement of one lever will engage one pulley with the axle and hold the opposite pulley stationary, leaving the opposite clutch and brake free, while the movement of the second lever will set the other clutch and brake and hold both pulleys and the spring from motion in either direction, substantially as shown and described.

5. In a car-starter, the combination, with the driving-axle and a torsional coil or spring adapted to be clutched at one end to the axle and held from rotating at the opposite end, of a friction-brake adapted to hold the fixed end of the spring in a yielding manner and a clutch arranged to engage the winding end to the axle with operative connections between the clutch and brake, and a hand-lever or manipulating device with a relative idle play between the clutch and brake, whereby after the clutch is set the tightening action of the brake may continue more or less to govern the winding of the spring and the resistance to the motion of the car in a graduated manner, substantially as and for the purpose set forth.

6. The combination, with the axle $e$, coil $k$, and pulleys B B', of the loose sleeve $n$, extending between the hubs of pulleys, with the clutch-hubs $m\ m$, fixed on the axle outside of said pulleys, and connecting-clutch mechanism to engage either pulley with the axle, and brakes or stops to hold either pulley stationary.

7. The combination, with the axle $e$, coil $k$, pulleys B B', loose on the axle, and loose sleeve $n$, extending snugly between the hubs of pulleys within the coil and preventing endwise motion of said pulleys, substantially as shown and described.

8. In a car, the combination, with the starting mechanism, of two operating hand-levers situated vertically at the front of the platform or dash-board and arranged to move from the center outward in opposite directions, substantially as shown and described.

9. In a car, the combination, with starter mechanism, of a rock-shaft extending longitudinally of the car-floor connected with the shifting or operating mechanism of the starter and terminating at each end in front of the platform or dash-board, with a socket-head, $v'$, on each end and a removable hand-lever, $v$, to fit the same, substantially as and for the purpose set forth.

10. In a car-starter, the combination, with the driving-axle, a torsional coil or spring thereon adapted to be clutched at one end to the axle and held stationary by a stop or brake at the opposite end, of an operating rock-shaft, $s$, a manipulating device connected with said rock-shaft, a crank-arm, $u$, extending from said rock-shaft, a link, $t$, extending from said crank-arm and operating the clutch of the spring, and a link extending oppositely from the crank-arm and operating the brake or stop of the spring, substantially as shown and described.

11. In a car-starter, the combination, with a driving-axle and a torsional coil or spring therefrom adapted to be clutched at one end to the axle and held by a brake or stop at the other, of the rock-shaft $s$, a manipulating device, $v$, extending thereon, crank $u$, links $t$, clutch-lever $r$, and brake-lever $p^3$, to which said links connect, arranged and operating substantially as shown and described.

12. The combination, with the pulleys B or B', of the brake-bands $o\ o$, nuts $p^2$, attached to said bands, right and left threaded rock-shaft $p$, engaging said nuts, and rocking mechanism connected to said shaft, substantially as set forth.

13. The combination, with the axle $e$, its spring-coil $k$, and its pulley or pulleys B B', of the brake or holder bands $o\ o$, with screw-threaded rock-shaft $p$, connecting said bands, and an operating device for rocking said shaft to tighten or loosen the bands, substantially as shown and described.

14. In a car-starter, the combination, with the driving-axle, of the loose pulleys B B' and the spring $k$, connected at one end to one pulley with the intermediate disk, $l$, to which opposite end of spring is connected, and a ratchet engagement between said disk and the opposite pulley, with clutches to engage the respective pulleys to the axle, and brakes to hold the same stationary, substantially as shown and described.

J. NEWTON WILLIAMS.

Witnesses:
CHAS. M. HIGGINS,
JNO. E. GAVIN.